(12) United States Patent
Massari et al.

(10) Patent No.: US 10,759,933 B2
(45) Date of Patent: Sep. 1, 2020

(54) NUCLEATED PROPYLENE POLYMER COMPOSITION

(71) Applicant: BASELL POLIOLEFINE ITALIA S.R.L., Milan (IT)

(72) Inventors: Paola Massari, Ferrara (IT); Andrea Felisati, Ferrara (IT); Marco Izzi, Frankfurt (DE); Claudio Cavalieri, Ferrara (IT); Marco Ciarafoni, Ferrara (IT); Silvia Guerra, Ferrara (IT); Roberto Pantaleoni, Ferrara (IT); Federica Malizia, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/341,584

(22) PCT Filed: Oct. 5, 2017

(86) PCT No.: PCT/EP2017/075288
§ 371 (c)(1),
(2) Date: Apr. 12, 2019

(87) PCT Pub. No.: WO2018/069127
PCT Pub. Date: Apr. 19, 2018

(65) Prior Publication Data
US 2019/0322850 A1 Oct. 24, 2019

(30) Foreign Application Priority Data

Oct. 14, 2016 (EP) .................................... 16193959

(51) Int. Cl.
| | |
|---|---|
| *C08L 23/12* | (2006.01) |
| *C08K 5/00* | (2006.01) |
| *C08K 5/098* | (2006.01) |
| *C08K 5/1575* | (2006.01) |
| *C08K 5/56* | (2006.01) |
| *C08L 23/14* | (2006.01) |

(52) U.S. Cl.
CPC ............ *C08L 23/12* (2013.01); *C08K 5/0083* (2013.01); *C08K 5/098* (2013.01); *C08K 5/1575* (2013.01); *C08K 5/56* (2013.01); *C08L 23/142* (2013.01); *C08L 2203/16* (2013.01); *C08L 2205/025* (2013.01); *C08L 2205/24* (2013.01)

(58) Field of Classification Search
CPC ........ C08L 23/12; C08L 23/142; C08L 23/16; C08L 2207/02; C08L 2203/162; C08L 2203/16; C08L 2205/024; C08L 2205/025; C08K 5/0083; C08K 5/1575; C08K 5/56; C08K 5/098
See application file for complete search history.

(56) References Cited

U.S. PATENT DOCUMENTS

| | | | |
|---|---|---|---|
| 6,300,415 B1 | 10/2001 | Okayama et al. | |
| 7,572,860 B2 | 8/2009 | De Palo et al. | |
| 2017/0313865 A1* | 11/2017 | Wang et al. | ............... C08F 8/50 |

FOREIGN PATENT DOCUMENTS

| | | |
|---|---|---|
| EP | 2733175 A1 | 5/2014 |
| RU | 2342411 C2 | 12/2008 |
| WO | 2010149705 A1 | 12/2010 |
| WO | 2012010678 A1 | 1/2012 |

OTHER PUBLICATIONS

International Search Report and Written Opinion dated Nov. 27, 2017 (dated Nov. 27, 2017) for Corresponding PCT/EP2017/075288.

* cited by examiner

*Primary Examiner* — Nathan M Nutter

(57) ABSTRACT

A nucleated propylene polymer composition made from or containing:
A) a propylene homopolymer; B) a copolymer of propylene with ethylene derived units;
the nucleated composition having a fraction soluble in xylene at 25° C. between 9.0 and 21.0 wt %, an intrinsic viscosity of the fraction soluble in xylene at 25° C. between 1.0 and 1.9 dl/g, a total melt flow rate between 1.5 and 5 g/10 min and the value of the relation (I):

$$22.5 + 0.2*MFR - 1.2*Xs + 0.2*IV \qquad (I)$$

is higher than 5.9; wherein MFR is the melt flow rate of the nucleated composition; IV is the intrinsic viscosity of the fraction soluble in xylene at 25° C.; and
Xs is the fraction soluble in xylene at 25° C., the amount of A+B is equal to 100 wt %, and the nucleating agent is selected from the group consisting of aromatic or aliphatic carboxylic acids, aromatic metal phosphates, sorbitol derivatives and talc.

10 Claims, No Drawings

NUCLEATED PROPYLENE POLYMER COMPOSITION

This application is the U.S. National Phase of PCT International Application PCT/EP2017/075288, filed Oct. 5, 2017, claiming benefit of priority to European Patent Application No. 16193959.0, filed Oct. 14, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a nucleated propylene polymer composition for films, including films having sealing properties.

BACKGROUND OF THE INVENTION

Isotactic polypropylene is useful in a variety of applications. For some applications and to improve polymer properties, one or more copolymerization steps or one or more monomers have been introduced in the homopolymer matrix of the propylene stereoregular homopolymerization process.

SUMMARY OF THE INVENTION

In a general embodiment, the present disclosure provides a nucleated propylene polymer composition made from or containing:
A) from 77 wt % to 91 wt %, of a propylene homopolymer having a fraction insoluble in xylene at 25° C. higher than 95%; and
B) from 9 wt % to 23 wt %, of a copolymer of propylene with from 28.0 wt % to 42.0 wt % of ethylene derived units; the nucleated composition having a fraction soluble in xylene at 25° C. between 9.0 wt % and 21.0 wt %, an intrinsic viscosity of the fraction soluble in xylene at 25° C. between 1.0 dl/g and 1.9 dl/g, a total melt flow rate (Melt Flow Rate according to ISO 1133, condition L, 230° C. and 2.16 kg load) between 1.5 and 5 g/10 min and the value of the relation (I):

$$22.5+0.2*MFR-1.2*Xs+0.2*IV \qquad (I)$$

is higher than 5.9; wherein
MFR is the melt flow rate of the nucleated composition (Melt Flow Rate according to ISO 1133, condition L, 230° C. and 2.16 kg load);
IV is the intrinsic viscosity of the fraction soluble in xylene at 25° C.; and
Xs is the fraction soluble in xylene at 25° C.,
the amount of A+B is equal to 100 wt %,
and the nucleating agent is selected from the group consisting of aromatic or aliphatic carboxylic acids, aromatic metal phosphates, sorbitol derivatives and talc.

In a general embodiment, the present disclosure provides a film made from or containing the nucleated propylene polymer composition.

DETAILED DESCRIPTION OF THE INVENTION

The present disclosure provides a nucleated propylene polymer composition made from or containing:
A) from 77 wt % to 91 wt %, alternatively from 80 wt % to 90 wt %, alternatively from 83 wt % to 89 wt % of a propylene homopolymer having a fraction insoluble in xylene at 25° C., higher than 95%, alternatively higher than 96 wt %; and
B) from 9 wt % to 23 wt %, alternatively from 10 wt % to 20 wt %, alternatively from 11 wt % to 17 wt % of a copolymer of propylene with from 28.0 wt % to 42.0 wt %, alternatively from 31.0 wt % to 39.0 wt %; alternatively from 32.0 wt % to 38.0 wt % of ethylene derived units; the nucleated composition having a fraction soluble in xylene at 25° C. between 9.0 wt % and 21.0 wt %; alternatively between 11.0 wt % and 18.0 wt %; alternatively between 12.0 wt % and 16.0 wt %; an intrinsic viscosity of the fraction soluble in xylene at 25° C. between 1.0 dl/g and 1.9 dl/g; alternatively from 1.2 dl/g to 1.7 dl/g; a total melt flow rate (Melt Flow Rate according to ISO 1133, condition L, 230° C. and 2.16 kg load) between 1.5 and 5 g/10 min; alternatively between 2.5 and 4.5 g/10 min and the value of the relation (I):

$$22.5+0.2*MFR-1.2*Xs+0.2*IV \qquad (I)$$

is higher than 5.9; alternatively is between 6.1 and 7.3; alternatively between 6.4 and 7.2; alternatively between 6.6 and 7.0;
wherein
MFR is the melt flow rate of the nucleated composition (Melt Flow Rate according to ISO 1133, condition L, 230° C. and 2.16 kg load);
IV is the intrinsic viscosity of the fraction soluble in xylene at 25° C.; and
Xs is the fraction soluble in xylene at 25° C.,
the amount of A+B is equal to 100 wt %,
and the nucleating agent is selected from the group consisting of aromatic or aliphatic carboxylic acids, aromatic metal phosphates, sorbitol derivatives and talc; alternatively the nucleating agent is selected from the group consisting of dibenzylidene sorbitol compounds, sodium benzoate, talc, metal salts of cyclic phosphoric esters, metal salts of hexahydrophthalic acid, and the unsaturated compound of disodium bicyclo [2.2.1]heptene dicarboxylate. In some embodiments, the dibenzylidene sorbitol compound is selected from the group consisting of unsubstituted dibenzylidene sorbitol (DBS), p-methyldibenzylidene sorbitol (MDBS), and 1,3-O-2,4-bis (3,4-dimethylbenzylidene) sorbitol (DMDBS). In some embodiments, the dibenzylidene sorbitol derivative is 1,3-O-2,4-bis (3,4-dimethylbenzylidene) sorbitol (DMDBS), which is commercially available from Milliken under the trade name Millad 3988. In some embodiments, the metal salt of cyclic phosphoric ester is sodium 2,2'-methylene-bis-(4,6-di-tert-butylphenyl) phosphate, which is commercially available from Asahi Denka Kogyo K. K. under the tradename NA-11. In some embodiments, the metal salt of cyclic phosphoric ester is a cyclic bis-phenol phosphate, which is commercially available under the tradename NA-21 from Asahi Denka. In some embodiments, calcium is the metal of the metal salt of hexahydrophthalic acid. In some embodiments, the unsaturated compound of disodium bicyclo [2.2.1]heptene dicarboxylate is commercially available under the tradename HPN-68 from Milliken.

As used herein, the term "copolymer" refers to polymers containing only propylene and ethylene.

In some embodiments, the present disclosure provides a film made from or containing the propylene polymer composition disclosed herein. In some embodiments, the film is cast film, BOPP film, or blown film. In some embodiments, the film is a monolayer film or a multilayer film.

In some embodiments, the propylene polymer compositions of the present disclosure are prepared by sequential polymerization in at least two stages, with each subsequent polymerization stage being conducted in the presence of the polymeric material formed in the immediately preceding polymerization reaction, wherein polymer (A) is prepared in at least one first polymerization stage and copolymer (B) is prepared in at least one second polymerization stage. The nucleating agent is added during a compounding process with other additives.

In some embodiments, each polymerization stage is carried out in presence of a highly stereospecific heterogeneous Ziegler-Natta catalyst. In some embodiments, the Ziegler-Natta catalysts is made from or contains a solid catalyst component made from or containing at least one titanium compound having at least one titanium-halogen bond and at least an electron-donor compound (internal donor), both supported on magnesium chloride. The Ziegler-Natta catalysts systems are further made from or contain an organo-aluminum compound as a co-catalyst and optionally as an external electron-donor compound.

In some embodiments, the catalyst systems are selected from the catalyst systems disclosed in European Patent Nos. EP45977, EP361494, EP728769, or EP 1272533, or Patent Cooperation Treaty Publication No. WO00163261.

In some embodiments, the solid catalyst component is made from or contains Mg, Ti, halogen and an electron donor selected from succinates of formula (I):

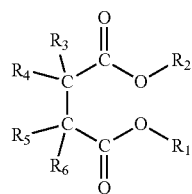
(I)

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the periodic table; and the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms. In some embodiments, the radicals $R^3$ to $R^6$ which are joined to the same carbon atom are linked together to form a cycle.

In some embodiments, $R^1$ and $R^2$ are selected from the group consisting of $C_1$-$C_8$ alkyl, cycloalkyl, aryl, arylalkyl and alkylaryl groups.

In some embodiments, $R^1$ and $R^2$ are selected from primary alkyls, alternatively branched primary alkyls. In some embodiments, $R^1$ and $R^2$ groups are selected from the group consisting of methyl, ethyl, n-propyl, n-butyl, isobutyl, neopentyl, and 2-ethylhexyl. In some embodiments, $R^1$ and $R^2$ groups are selected from the group consisting of ethyl, isobutyl, and neopentyl.

In some embodiments, $R^3$ to $R^5$ are hydrogen and $R^6$ is selected from the group consisting of branched alkyl, cycloalkyl, aryl, arylalkyl and alkylaryl radicals having from 3 to 10 carbon atoms. In some embodiments, at least two radicals from $R^3$ to $R^6$ are different from hydrogen and selected from $C_1$-$C_{20}$ linear or branched alkyl, alkenyl, cycloalkyl, aryl, arylalkyl or alkylaryl group, optionally containing heteroatoms belonging to groups.

In some embodiments, two radicals different from hydrogen are linked to the same carbon atom. In some embodiments, when at least two radicals different from hydrogen are linked to different carbon atoms, the radicals are $R^3$ and $R^5$ or $R^4$ and $R^6$.

In some embodiments, the solid catalyst component is prepared by reacting a titanium compound of formula $Ti(OR)_{n-y}X_y$ where n is the valence of titanium and y is a number between 1 and n with a magnesium chloride deriving from an adduct of formula $MgCl_2.pROH$, where p is a number between 0.1 and 6, alternatively from 2 to 3.5, and R is a hydrocarbon radical having 1-18 carbon atoms. In some embodiments, the titanium compound is TiC4. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). In some embodiments, the emulsion is quickly quenched, thereby causing the solidification of the adduct in the form of spherical particles. In some embodiments, the spherical adducts are prepared as disclosed in U.S. Pat. No. 4,399,054 or 4,469,648. In some embodiments, the adduct is directly reacted with the Ti compound. In some embodiments, the adduct is previously subjected to thermal controlled dealcoholation (80-130° C.), thereby obtaining an adduct in which the number of moles of alcohol is lower than 3, alternatively between 0.1 and 2.5. In some embodiments, the reaction with the Ti compound is carried out by suspending the adduct in cold $TiCl_4$. In some embodiments, the temperature of the $TiCl_4$ is 0° C. The mixture is heated up to 80-130° C. and maintained at this temperature for 0.5-2 hours. In some embodiments, the treatment with $TiCl_4$ is carried out one or more times. In some embodiments, the internal donor is added during the treatment with $TiCl_4$. In some embodiments, the treatment with the electron donor compound is repeated one or more times. In some embodiments, the succinate of formula (I) is used in molar ratio with respect to the $MgCl_2$ of from 0.01 to 1, alternatively from 0.05 to 0.5. In some embodiments, preparation of catalyst components in spherical form occurs as disclosed in European Patent Application No. EP-A-395083 or in Patent Cooperation Treaty Publication No. WO98144001. In some embodiments, the solid catalyst components show a surface area (by B.E.T. method) between 20 and 500 m2/g, alternatively between 50 and 400 m2/g, and a total porosity (by B.E.T. method) higher than 0.2 cm3/g, alternatively between 0.2 and 0.6 cm3/g. In some embodiments, the porosity (Hg method) due to pores with radius up to 10.000 A ranges from 0.3 to 1.5 cm3/g, alternatively from 0.45 to 1 cm3/g.

In some embodiments, the organo-aluminum compound is an alkyl-Al selected from the trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, mixtures of trialkylaluminums with alkylaluminum halides, alkylaluminum hydrides or alkylaluminum sesquichlorides are used. In some embodiments, the alkylaluminum halide is $AlEt_2Cl$. In some embodiments, the alkylaluminum sesquichloride is $Al_2Et_3Cl_3$.

In some embodiments, external electron-donor compounds are selected from the group consisting of silicon compounds, ethers, esters, amines, heterocyclic compounds, ketones and the 1,3-diethers. In some embodiments, the ester is ethyl 4-ethoxybenzoate. In some embodiments, the heterocyclic compound is 2,2,6,6-tetramethyl piperidine. In some embodiments, the external donor compounds is a silicon compound of formula $R_a{}^5R_b{}^6Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiment, the silicon compound is selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1-trifluoropropyl-2-ethylpiperidinyl-dimethoxysilane, and 1,1,1-trifluoropropyl-methyldimethoxysilane. The external electron donor compound is used in such an amount to give a molar ratio between the organo-aluminum compound and the electron donor compound of from 0.1 to 500.

In some embodiments, the polymerization process is carried out in gas phase or in liquid phase. In some embodiments, the polymerization process is carried out in continuous or batch reactors. In some embodiments, the polymerization process is carried out in fluidized bed or slurry reactors. In some embodiments, the polymerization of the propylene polymer (A) is carried out in liquid phase, using liquid propylene as diluent and the copolymerization stage to obtain the propylene copolymer fraction (B) is carried out in gas phase, without intermediate stages except for the partial degassing of the monomers. In some embodiments, the sequential polymerization stages are carried out in gas phase. In some embodiments, the temperature for the preparation of fraction (A) and (B) is the same. In some embodiments, the temperature is different. In some embodiments, the temperature is the range from 50° C. to 120° C. In some embodiments, the polymerization pressure ranges from 0.5 to 30 MPa if the polymerization is carried out in gas-phase. In some embodiments, the catalytic system is pre-contacted (pre-polymerized) with small amounts of olefins. In some embodiments, the molecular weight of the propylene polymer composition is regulated. In some embodiments, the molecular weight regulator is hydrogen.

In some embodiments, the propylene/ethylene copolymer (B) is produced in a fluidized-bed gas-phase reactor in the presence of the polymeric material and the catalyst system coming from the preceding polymerization step. In some embodiment, the nucleated propylene polymer compositions are made from or further contain additives. In some embodiments, the additives are selected from the group consisting of antioxidants, light stabilizers, antacids, colorants and fillers.

In some embodiments, the nucleated propylene polymer compositions present an X-ray spectrum having a degree of crystallinity lower than 60% measured on rotating compression molded DMTA plaques.

The following examples are given to illustrate and not to limit the present disclosure

EXAMPLES

The data of the propylene polymer materials were obtained according to the following methods:
Xylene-Soluble Faction at 25° C.
The Xylene Soluble fraction was measured according to ISO 16152, 2005, but with the following deviations (the ISO 16152 specification provided within parentheses) The solution volume was 250 ml (200 ml)

During the precipitation stage at 25° C. for 30 min, the solution, for the final 10 minutes, was kept under agitation by a magnetic stirrer (30 min, without any stirring at all)
The final drying step was done under vacuum at 70° C. (100° C.)

The content of the xylene-soluble fraction was expressed as a percentage of the original 2.5 grams and then, by difference (complementary to 100), the xylene insoluble %
Ethylene (C2) Content
$^{13}C$ NMR of Propylene/Ethylene Copolymers
$^{13}C$ NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP=100T_{\beta\beta}/S \ PPE=100T_{\beta\delta}/S \ EPE=100T_{\delta\delta}/S$$

$$PEP=100S_{\beta\beta}/S \ PEE=100S_{\beta\delta}/S \ EEE=100(0.25S_{\gamma\delta}+0.5S_{\delta\delta})/S$$

$$S=T_{\beta\beta}+T_{\beta\delta}+T_{\delta\delta}+S_{\beta\beta}+S_{\beta\delta}+0.25S_{\gamma\delta}+0.5S_{\delta\delta}$$

The molar percentage of ethylene content was evaluated using the following equation:

$$E \% \text{ mol}=100*[PEP+PEE+EEE]$$

The weight percentage of ethylene content was evaluated using the following equation:

$$E \% \text{ wt.} = \frac{100*E \% \text{ mol}*MW_E}{E \% \text{ mol}*MW_E + P \% \text{ mol}*MW_P}$$

where P % mol is the molar percentage of propylene content while $MW_E$ and $MW_P$ are the molecular weights of ethylene and propylene, respectively.

The product of reactivity ratio $r_1/r_2$ was calculated according to Carman (C. J. Carman, R. A. Harrington and C. E. Wilkes, Macromolecules, 1977; 10, 536) as:

$$r_1 r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of Propylene sequences was calculated as mm content from the ratio of the PPP mmT$_{\beta\beta}$ (28.90-29.65 ppm) and the whole T$_{\beta\beta}$ (29.80-28.37 ppm).
Ethylene C2 content was measured on the final composition. The ethylene content of component B) was calculated by using the formula C2tot=$X_B C2_B$ wherein $X_B$ was the amount of component B in the composition.

Molar Ratio of Feed Gasses

Determined by gas-chromatography

Melt flow rate (MFR)

The melt flow rate MFR of the polymer was determined according to ISO 1133 (230° C., 2.16 Kg).

Intrinsic Viscosity

Determined in tetrahydronaphthalene at 135° C.

Preparation of the Films

Films with a thickness of 70 μm were prepared by extruding each test composition in a single screw Collin extruder (length/diameter ratio of screw 1:25) at a film drawing speed of 7 m/min and a melt temperature of 210-250° C.

Sealing Test

The films were conditioned for 24 hours at 23° C. For each film, three rectangular samples with dimensions of 14 cm in machine direction and 7 cm in transverse direction were cut. The rectangular samples were double folded along the transverse direction to obtain book-folded samples that were then sealed along the folding line at 4 bar and 190° C. with a Brugger HSG/ETK sealing machine having polytetrafluoroethylene-coated sealing jaws having width 10 mm and contact time 1 s.

After being sealed, the book-folded samples were sterilized at 135° C. for 45 min, maintained at room temperature in autoclave for 12 h and then conditioned at 23° C. for 6 h. From each book-folded sample, three book-folded specimens having width of 15 mm were obtained by using a die cutter, thereby obtaining nine book-folded specimens for each type of film.

The sealing properties were determined as the peeling strength in Newton of the book folded specimens, evaluated with an Instron 5565A dynamometer at 100 mm/min with a distance between the clamps of 30 mm.

Haze

Haze was measured on the films with thickness of 70 μm using a Gardner Hazemeter, model HazeGard Plus, according to ASTM D 1003-13.

X Ray Diffraction

X ray spectra were recorded on compression molded DMTA plaques. To minimize the orientation of the crystallites, the spectrum was recorded on a rotating plaque. The calculation of degree of crystallinity was performed by using two phase model and single line fitting procedure. The degree of crystallinity of the polymer of Example 1 was determined to be 58.0%.

Example 1

Preparation of the Solid Catalyst

Into a 500 mL four-necked round flask, purged with nitrogen, 250 mL of $TiCl_4$ were introduced at 0° C. Prepared microspheroidal $MgCl_2 \cdot 2.1 C_2H_5OH$ having average particle size of 47 μm as described in Example 1 of European Patent No. EP728769. While stirring, 10.0 g of microspheroidal $MgCl_2 \cdot 2.1 C_2H_5OH$ having average particle size of 47 μm is added to an amount of diethyl 2,3-diisopropylsuccinate in racemic form to have a Mg/succinate molar ratio of 24. The temperature was raised to 100° C. and maintained for 60 min. The stirring was stopped. The liquid was siphoned off. The treatment with $TiCl_4$ was repeated at 110° C. for 30 min. After siphoning, fresh $TiCl_4$ and an amount of 9,9-bis(methoxymethyl)fluorine was added, thereby obtaining a Mg/diether molar ratio of 12. The temperature was raised to 90° C. for 30 min. After settling and siphoning at 85° C., the solid was washed six times with anhydrous hexane (6×100 ml) at 60° C.

Polymerization

The polymerization run was carried out in continuous mode in a series of two reactors equipped with devices to transfer the product from the first reactor to the second reactor. The first reactor was a liquid phase loop reactor, and the second reactor was a fluidized bed gas-phase reactor. The propylene homopolymer was prepared in the liquid loop reactor while the propylene ethylene copolymer was prepared in the gas-phase reactor in the presence of the propylene homopolymer coming from the first reactor. Hydrogen was used as molecular weight regulator. The gas phase components (propylene, ethylene and hydrogen) were continuously analyzed via gas-chromatography. At the end of the run the powder was discharged and dried under a nitrogen flow.

The main polymerization conditions and the analytical data relating to the polymers produced in the two reactors are reported in Table 1. Properties of the polymer are reported in Table 2.

Comparative Example 2

Comparative Example 2 was produced using a catalyst prepared as described in Example 5, lines 48-55 of European Patent EP728769. Triethylaluminum (TEAL) was used as the co-catalyst and cyclohexyl-methy-dimethoxysilane was used as an external donor.

The main polymerization conditions and the analytical data relating to the polymers produced in the two reactors are reported in Table 1. Properties of the polymer are reported in Table 2.

Comparative Example 3

Comparative Example 3 was produced using the same catalyst of Example 1.

The main polymerization conditions and the analytical data relating to the polymers produced in the two reactors are reported in Table 1. Properties of the polymer are reported in Table 2.

TABLE 1

| PROCESS CONDITIONS | Ex. 1 | Comp Ex 2 | Comp Ex. 3 |
|---|---|---|---|
| Precontact | | | |
| Temperature ° C. | 12 | 12 | 12 |
| Residence time (min) | 20 | 15 | 15 |
| Teal/donor ratio | 4.3 | 5 | 3.5 |
| Prepolymerization | | | |
| Temperature ° C. | 20 | 20 | 20 |
| Residence time (min) | 6.5 | 10 | 10 |
| Loop $1^{st}$ reactor in liquid phase - propylene homopolymer | | | |
| Temperature, ° C. | 75 | 75 | 75 |
| Pressure, bar | 40 | 38 | 38 |
| Residence time, min | 53 | 60 | 60 |
| H2/C3 mol/ppm | 1320 | 410 | 280 |
| Split, wt % | 85 | 80 | 82 |
| Gas-Phase reactor - ethylene/propylene copolymerization | | | |
| Temperature, ° C. | 70 | 75 | 70 |
| Pressure, bar | 14 | 15 | 12 |

TABLE 1-continued

| PROCESS CONDITIONS | Ex. 1 | Comp Ex 2 | Comp Ex. 3 |
|---|---|---|---|
| Residence time, min | 18 | 18 | 18 |
| H2/C3 mol/mol | | | |
| H2/C2 mol/mol | 0.264 | 0.048 | 0.068 |
| C2/C2 + C3 mol/mol | 0.2 | 0.24 | 0.42 |
| split wt % | 15 | 20 | 18 |

C2 ethylene;
C3 propylene; H2 hydrogen
*Amount of component B with respect to A + B
$C_2^-$ = ethylene
$C_3^-$ = propylene The following additives were added to the Example 1 material:

| | | Ex. 1 | Comp Ex 2 | Comp Ex. 3 |
|---|---|---|---|---|
| Polymer composition of the example | wt % | 99.670 | 99.770 | 99.770 |
| Antioxidants | wt % | 0.1725 | 0.1725 | 0.1725 |
| Calcium stearate | wt % | 0.0575 | 0.0575 | 0.0575 |
| Millad 3988 | wt % | 0.1000 | 0 | 0 |

The materials were extruded and analyzed. A 70 μm film was obtained. The properties are reported in Table 2.

TABLE 2

| | | Example | | |
|---|---|---|---|---|
| | | Ex. 1 | Comp Ex 2 | Comp Ex. 3 |
| component A) | | | | |
| Xylene insolubles at 25° C. | % | >96 | >96 | >96 |
| % copolymer component B) | wt % | 14 | 16 | 15 |
| % $C_2^-$ component B) | wt % | 35.0 | 38.5 | 55.0 |
| properties of the composition | | | | |
| MFR of the composition | g/10 min | 3.1 | 0.8 | 0.9 |
| Xylene soluble at 25° C., Xs | wt % | 13.7 | 16.2 | 14.8 |
| XsIV | dl/g | 1.5 | 2.5 | 3.0 |
| relation (I) | | 7.0 | 3.7 | 5.5 |
| haze 70 μm film | % | 6.2 | 40.2 | n.m. |
| sealing test | N | 30.5 | 26.4 | 28.8 |

$C_2^-$ = ethylene
XsIV = intrinsic viscosity of fraction soluble in xylene at 25° C.
n.m. = not measured

What is claimed is:

1. A nucleated propylene polymer composition comprising:
   A) from 77 wt % to 91 wt %, of a propylene homopolymer having a fraction insoluble in xylene at 25° C. higher than 95%; and
   B) from 9 wt % to 23 wt %, of a copolymer of propylene with from 28.0 wt % to 42.0 wt % of ethylene derived units;
   the nucleated composition having a fraction soluble in xylene at 25° C. between 9.0 wt % and 21.0 wt %, an intrinsic viscosity of the fraction soluble in xylene at 25° C. between 1.0 dl/g and 1.9 dl/g, a total melt flow rate (Melt Flow Rate according to ISO 1133, condition L, 230° C. and 2.16 kg load) between 1.5 and 5 g/10 min and the value of the relation (I):

$$22.5+0.2*MFR-1.2*Xs+0.2*IV \qquad (I)$$

is higher than 5.9; wherein
   MFR is the melt flow rate of the nucleated composition (Melt Flow Rate according to ISO 1133, condition L, 230° C. and 2.16 kg load);
   IV is the intrinsic viscosity of the fraction soluble in xylene at 25° C.; and
   Xs is the fraction soluble in xylene at 25° C.,
   the amount of A+B is equal to 100 wt %,
   and the nucleating agent is selected from the group consisting of aromatic or aliphatic carboxylic acids, aromatic metal phosphates, sorbitol derivatives and talc.

2. The nucleated composition according to claim 1, wherein component A) is present in an amount ranging from 80 wt % to 90 wt %, and component B) is present in an amount ranging from 10 wt % to 20 wt %, wherein the amount of A+B is equal to 100 wt %.

3. The nucleated composition according to claim 1, wherein the fraction insoluble in xylene at 25° C. of component A) is higher than 96 wt %.

4. The nucleated composition according to claim 1, wherein the ethylene derived units of component B) are from 28.0 wt % to 42.0 wt %.

5. The nucleated composition according to claim 1, wherein the intrinsic viscosity of the fraction soluble in xylene at 25° C. is between 1.2 dl/g to 1.7 dl/g.

6. The nucleated composition according to claim 1, wherein the fraction soluble in xylene at 25° C. is between 11.0 wt % to 18.0 wt %.

7. The nucleated composition according to claim 1, wherein the total melt flow rate (Melt Flow Rate according to ISO 1133, condition L, 230° C. and 2.16 kg load) is between 2.5 and 4.5 g/10 min.

8. The nucleated composition according to claim 1, wherein the value of the relation (I) is between 6.1 and 7.3.

9. The nucleated composition according to claim 1, wherein the value of the relation (I) is between 6.4 and 7.2.

10. A film comprising:
    the nucleated propylene polymer composition according to claim 1.

* * * * *

UNITED STATES PATENT AND TRADEMARK OFFICE
CERTIFICATE OF CORRECTION

| | |
|---|---|
| PATENT NO. | : 10,759,933 B2 |
| APPLICATION NO. | : 16/341584 |
| DATED | : September 1, 2020 |
| INVENTOR(S) | : Massari et al. |

It is certified that error appears in the above-identified patent and that said Letters Patent is hereby corrected as shown below:

On the Title Page

Column 1, Item (30), Line 1, delete "16193959" and insert -- 16193959.0 --, therefor Signed and Sealed this
Eighth Day of November, 2022

Katherine Kelly Vidal
*Director of the United States Patent and Trademark Office*